United States Patent [19]

Brown

[11] 4,392,763
[45] Jul. 12, 1983

[54] DEVICE FOR USE WITH A TOGGLE BOLT
[76] Inventor: Russell L. Brown, 1620 Kingsbury La., Oklahoma City, Okla. 73116
[21] Appl. No.: 178,830
[22] Filed: Aug. 18, 1980
[51] Int. Cl.³ .......................................... F16B 21/00
[52] U.S. Cl. .................... 411/342; 411/548
[58] Field of Search ...................... 411/15, 32, 33, 63, 411/64, 340, 341, 342, 343, 344, 345, 346, 349, 350, 548

[56] References Cited

U.S. PATENT DOCUMENTS

| | | | |
|---|---|---|---|
| 1,367,080 | 2/1921 | Ogden | 411/33 |
| 2,024,871 | 12/1935 | Parsons | 411/342 |
| 2,078,473 | 4/1937 | Truemper | 411/15 |
| 2,398,220 | 4/1946 | Gelpcke | 411/342 |
| 2,882,547 | 4/1959 | Bacon | 411/435 X |
| 2,950,141 | 8/1960 | Koff | 411/340 X |
| 3,082,578 | 3/1963 | Lindstaedt et al. | 411/15 X |
| 3,127,808 | 4/1964 | Drybread | 411/346 |
| 3,241,420 | 3/1966 | Passer | 411/346 |
| 3,285,118 | 11/1966 | Elkins | 411/346 |
| 3,288,014 | 11/1966 | Mortensen | 411/344 |
| 3,389,631 | 6/1968 | Vaillancourt | 411/346 |
| 3,513,746 | 5/1970 | Forsberg | 411/346 |
| 4,116,104 | 9/1978 | Kennedy | 411/342 X |
| 4,245,545 | 1/1981 | Freeman | 411/342 |

FOREIGN PATENT DOCUMENTS

| | | | |
|---|---|---|---|
| 508342 | 1/1952 | Belgium | 411/15 |
| 10046 | of 1894 | United Kingdom | 411/340 |

Primary Examiner—Thomas J. Holko
Attorney, Agent, or Firm—Christopher H. Morgan

[57] ABSTRACT

A device for use with a toggle bolt of the type having a toggle threadable to a bolt. The device comprises a spool which has an opening for receiving the bolt therethrough. Connected to the spool is a leg member for extending along the bolt such that the toggle is guided by the leg member as the toggle is engaged by the bolt. The spool fits in the hole in a securing member through which the bolt extends to fix the bolt with respect to the securing member.

4 Claims, 9 Drawing Figures

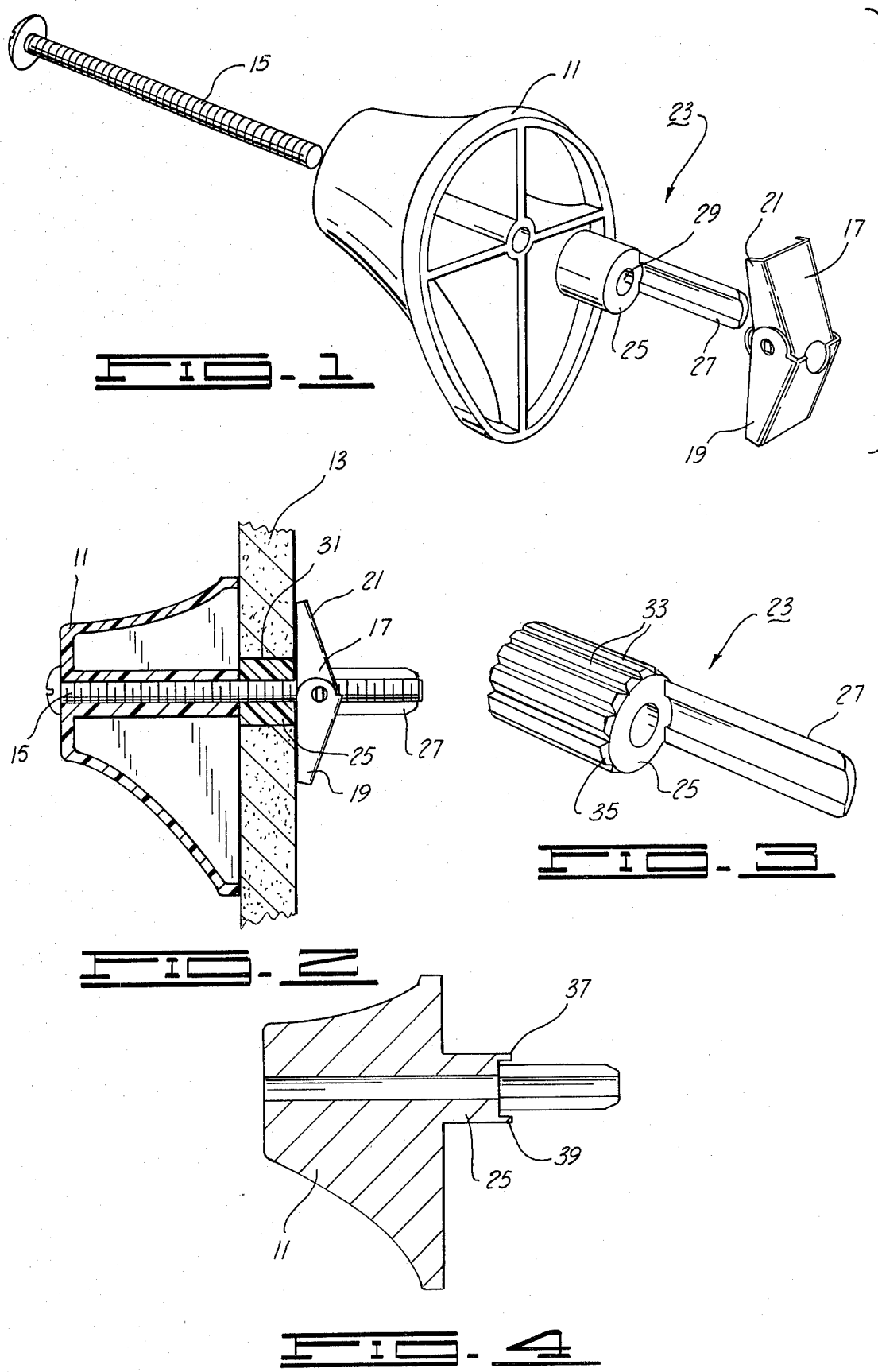

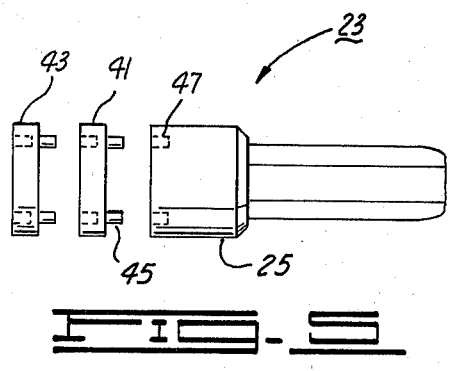 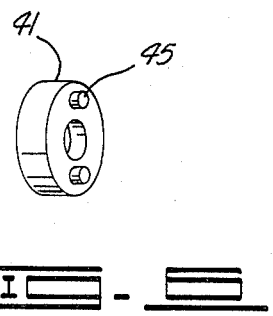
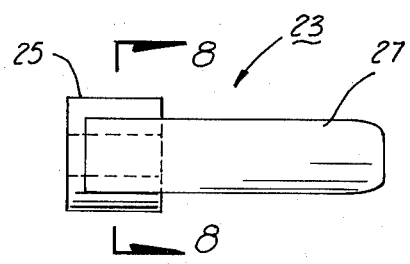 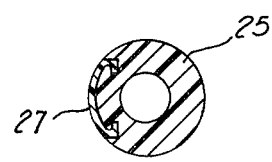
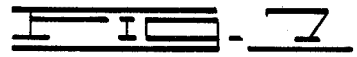 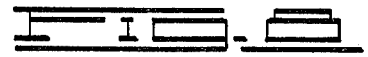
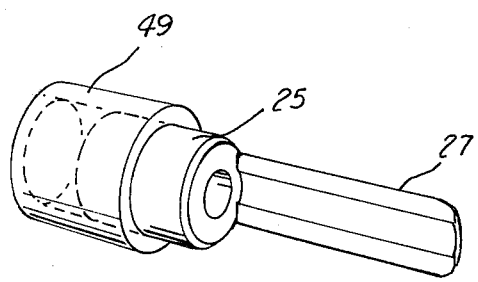
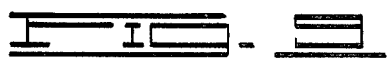

DEVICE FOR USE WITH A TOGGLE BOLT

BACKGROUND OF THE INVENTION

1. Field of the Invention

This device relates in general to securing devices and more particularly to toggle bolts and to equipment for use with toggle bolts.

2. Description of the Prior Art

A wide variety of securing devices are presently available. Among these securing devices is the toggle bolt. Toggle bolts are generally utilized for securing objects to walls or other securing members having one side which is inaccessible.

Toggle bolts consist of a threaded bolt and a toggle which can be threaded onto the bolt. The toggle has a pair of wings which are urged open by a spring. In their collapsed position, the wings fit closely about the periphery of the bolt so that the toggle and bolt shaft can be inserted through a hole.

In connecting an object to the wall or the like by a toggle bolt, a hole is first drilled in the wall. This hole must have a diameter which is sufficient to allow the collapsed toggle to pass through the hole. Next, the object to be secured to the wall is positioned about the bolt shaft and the toggle is threaded to the end of the bolt. The toggle wings are then collapsed and the toggle is passed through the hole by pushing the bolt shaft. After the toggle wings are completely through the wall the toggle springs open. Next, the toggle is pulled back into engagement with the wall such that the toggle wings bridge the hole in the wall. Holding the toggle wings against the wall surface so that the toggle does not rotate, the bolt is then rotated with respect to the toggle until the head of the bolt engages the object and the object is secured against the wall.

While toggle bolts have been used advantageously in the past, several problems have been present. One problem is that the toggle must be held against the wall as the bolt is tightened. This is an awkward and time-consuming effort. It is awkward because tightening the bolt usually causes the bolt to be urged inwardly and holding the toggle against the wall requires the bolt to be urged outwardly. Thus, as the bolt is tightened, the toggle often disengages from the wall and the toggle spins with the bolt as the bolt is rotated. Since the toggle is not visible inside the wall, this useless rotation of the bolt can continue unnoticed for some time.

Another problem with toggle bolts is that the hole drilled for insertion of the bolt must be larger than the diameter of the bolt in order for the toggle to pass through the hole. Since this hole is larger than the shaft of the bolt the shaft is free to shift inside the hole. This is undesirable in itself and can cause mechanical working of the bolt against the wall material possibly resulting in a failure of the wall material or the bolt.

Another problem caused by the bolt shaft being smaller than the hole it passes through is that the toggle wings may unsymmetrically bridge the hole. If the bolt shaft is not centered in the hole one wing of the toggle may encounter more wall surface than the other wing. The portion of the wall supporting the smaller part of the toggle is likely to fail which in turn causes the remaining portion of the wall beneath the toggle to fail. This is especially a problem with soft wall materials such as sheetrock.

Another problem with soft wall materials such as sheetrock is that the toggle can be over-tightened such that the toggle cuts through the sheetrock leaving only a small amount of sheetrock or none at all which supports or anchors the toggle bolt. Since the toggle is not visible it is difficult to know when the toggle is tightened sufficiently.

A problem with very strong wall materials is that over-tightening the toggle can cause the toggle to break. This is especially true where the wall hole is large creating a strong lever action on the toggle as it is tightened.

Still another problem with toggle bolts is that they are difficult to remove from the wall. This difficulty arises because the toggle does not threadedly engage the bolt when it is not in contact with the wall. Thus, to remove the toggle from the bolt it is necessary that the toggle be held against the wall while the bolt is rotated.

Still another problem with toggle bolts has been that the toggle wings are difficult to orient with respect to the wall. This orientation is desired because the toggle wings provide more strength along their axes than in other directions. However, in the past, it has been difficult to orient the toggle wings since they are not visible inside the wall.

SUMMARY OF THE INVENTION

It is an object of the present invention to provide an improved toggle bolt. More specifically, it is an object to provide a device for use with a toggle bolt which allows the toggle to be more easily engaged by the bolt.

It is also an object to provide such a device which fixes the bolt in the hole in the securing member.

It is another object of the present invention to provide an improved toggle bolt which is more secure.

Yet another object is to provide a device which prevents the toggle from cutting through the securing member as it is tightened.

A further object is that this device reduce the tendency of the toggle to break when the toggle is over-tightened.

Still another object of this invention is the provision of a device which orients the toggle with respect to the securing object. This orientation can improve the strength of the toggle along a particular direction.

Yet another object of the present invention is to provide a device for use with a toggle bolt which allows the toggle to be easily engaged with the bolt witout necessarily pulling the toggle into contact with the securing member.

In accordance with the objects, the present invention comprises a device for use with a toggle bolt of the type having a threaded bolt for extending through a hole in a securing member and a toggle threadable to said bolt and having a pair of wings for expanding and bridging the hole and thereby anchoring the bolt to the securing member. The device comprises a spacer which extends about the bolt inside the hole for fixing the bolt in the hole. It also comprises a leg member which is disposed along the bolt such that the toggle is guided by the leg member as the toggle is engaged by the bolt. The position of this leg member orients the toggle with respect to the securing object.

For a further understanding of the invention and further objects, features and advantages thereof, reference may now be had to the following description taken in conjunction with the accompanying drawings.

BRIEF DESCRIPTION OF THE DRAWINGS

FIG. 1 is an exploded persepctive view of the present invention.

FIG. 2 is a cross-sectional view taken along the bolt axis of the device of FIG. 1 attached to a wall.

FIG. 3 is a perspective view of an alternate embodiment of the present invention.

FIG. 4 is a cross-sectional view of another embodiment of the present invention taken along lines corresponding to the cross-section shown in FIG. 2.

FIG. 5 is a side view of another embodiment of the present invention.

FIG. 6 is a perspective view of one of the elements shown in FIG. 5

FIG. 7 is a side view of another embodiment of the present invention.

FIG. 8 is a cross-sectional view of the device of FIG. 7 taken along the lines shown in FIG. 7.

FIG. 9 is a perspective view of another embodiment of the present invention.

DESCRIPTION OF THE PREFERRED EMBODIMENTS

Referring now to FIGS. 1 and 2, the improved toggle bolt of the present invention is shown with a wall bracket 11. In FIG. 2 the wall bracket 11 is connected or anchored to a wall board 13. The wall bracket, of course, is only representative of those things which might be anchored to a wall or the like by a toggle bolt.

As shown in FIGS. 1 and 2, the bolt 15 and the toggle 17 are conventional and well known parts of a toggle bolt. As described above, the toggle 17 has a pair of wings 19 and 21 which spring open after they pass through the wall board 13 to provide an anchor for bolt 15. The toggle 17 has a nut (not shown) attached to a central hinge. The nut receives the threads of bolt 15.

As shown in FIG. 1, the present invention includes a spool piece 23. The spool piece 23 has a spool 25 and a leg 27. The leg 27 is connected to spool 25 and extends axially from the outer rim of one end of spool 25.

Spool 25 has an axial cylindrical hole 29 disposed through its length for receiving bolt 15 therethrough. When bolt 15 extends through hole 29, leg 27 is disposed parallel to and slightly spaced from the shaft of the bolt 15. Preferably, leg 27 is spaced from the shaft of bolt 15 a distance which is just sufficient to allow the side of toggle 17 to pass beneath the leg as it is threaded onto bolt 15. The leg 27 prevents toggle 17 from freely rotating on bolt 15 with respect to spool 25 and thus guides the toggle as it is threadedly engaged by the bolt.

Referring now to FIG. 2, spool 25 is shown inserted in a hole 31 in wall board 13. Spool 25 is approximately the same diameter as hole 31 so that spool 25 fixes and centers shaft 15 in hole 31 and so that spool 25 securely engages wall board 13. This diameter is usually slightly larger than the collapsed diameter of toggle 17 since, as described above, a collapsed toggle 17 must be inserted through hole 31 in order for the toggle bolt to operate. Therefore, in this circumstance, spool 25 is slightly larger than the diameter of toggle 17.

Spool 25 has approximately the same diameter as hole 31 such that the outer surface of spool 25 will securely engage wall board 13 when it is inserted in hole 31. This is important since it is desirable that spool 25 not rotate with respect to wall board 13 once inserted therein. It is also important in order that bolt 15 be securely centered in hole 31. The importance of these features is described in more detail below.

Spool 25 is approximately the same length as the thickness of the wall board 13. Therefore, when spool 25 is inserted in hole 31, the ends of spool 25 are flush with the inner and outer surfaces of wall board 13. This is important since the wall bracket 11 and toggle 17 will be adjacent opposite ends of spool 25 when the toggle is tightened onto bolt 15. In this tightened position wall board 13 must be securely wedged between the wall bracket 11 and toggle 17. At the same time, the toggle 17 must not be so tightly wedged that the wings 19 and 21 cut into wall board 13.

In practice, wall boards and other objects to which it is desirable to secure toggle bolts are of a standard thickness. Therefore, spool 25 can be provided with a standard length to match the standard thickness of a matching wall board 13.

To secure the wall bracket 11 to a wall board 13 by the toggle bolt of the present invention, hole 31 is drilled in wall board 13. Hole 31 is the same diameter as spool 25 and is slightly larger than the collapsed diameter of toggle 17. Next, bolt 15 is passed through wall bracket 11 and then spool piece 23. The leg 27 of spool piece 23 is oriented to face away from wall bracket 11. Toggle 17 is then threaded onto the end of bolt 15, the legs 19 and 21 are placed in a collapsed position, and the assembly is fitted into hole 31.

As toggle 17 is inserted through hole 31, leg 27 and spool 25 are also inserted into hole 31. By determining the position of leg 27 as spool piece 23 is inserted into hole 31, the position of toggle 17 with respect to wall board 13 can be determined and this position is maintained since toggle 17 is guided by leg 27 and spool 25 engages wall board 13 at the inner surface of hole 31 to prevent rotation of spool 25 and leg 27.

After toggle 17 passes through hole 31, toggle wings 19 and 21 spring open. Bolt 15 is then rotated to tighten the toggle 17 onto bolt 15 until wall board 13 is wedged between toggle 17 and wall bracket 11. Toggle 17 does not need to be pulled into contact with wall board 13 in this operation. Spool 25 prevents leg 27 and toggle 17 from freely rotating. This guides toggle 17 allowing the threads to engage. Spool 25 also prevents toggle 17 from cutting wall board 13 if over-tightened. Still further, spool 25 prevents toggle 17 from breaking if over-tightened because it presses against the center of toggle 17 and prevents the legs 19 and 21 from exerting a lever-type force on toggle 17 as it is tightened.

Referring now to FIG. 3, the spool piece 23 is shown in an alternate embodiment with a plurality of ribs 33 disposed axially on the outer surface of spool 25. Also, spool 25 is tapered from its outer end to its inner end (the end to which leg 27 is attached). A sharp taper 35 is provided on the inner end.

The ribs 33 cooperate to prevent the spool 25 from rotating with respect to wall board 13 while still allowing easy insertion of spool 25 into wall board 13. The provision of ribs 33 is preferable where wall board 13 is made of a soft material such as sheetrock. Such soft material tends to crumble and does not secure the spool as well as harder material.

Tapering the spool 25 from its outer end to its inner end also improves the ability of spool 25 to securely engage wall board 13. By making the outer diameter slightly larger than the diameter of hole 31, a snug fit of spool 25 in hole 31 is insured. If necessary, the operation of tightening toggle 17 onto bolt 25 can drive spool 25 into hole 31.

The sharp taper 35 of spool 25 facilitates the insertion of spool 25 into hole 31.

As shown in FIG. 4, spool 25 can be formed as an integral portion of wall bracket 11 or other objects to be secured by the toggle bolt. This removes one step from the assembly of the toggle bolt to the wall bracket. In fact, to speed installation wall brackets 11 can be preassembled with bolts 15 and toggle 17 such that the only step of installation is drilling hole 31, positioning the wall bracket and tightening bolt 15. Another advantage of the combination shown in FIG. 4 is that the toggle will automatically be oriented along a particular axis with respect to wall bracket 11. As shown in FIG. 4, toggle 17 will be oriented vertically if the wall bracket is oriented vertically. This insures that the toggle will provide maximum strength to the bracket.

To further facilitate easy installation, spool 25 as shown in FIG. 4 includes a pair of flanges 37 and 39 extending axially along the inner end of spool 25. These flanges are disposed approximately 90° to leg 27. Flanges 37 and 39 are positioned to capture wings 19 and 21 of toggle 17 in their collapsed position. Thus, in a preassembled form, bolt 15 can be tightened such that wings 19 and 21 are captured beneath flanges 37 and 39. After wall bracket 11 has been positioned with respect to wall board 13 bolt 15 can then be rotated to back the toggle until wings 19 and 21 are no longer captured by flanges 37 and 39 and the toggle springs open. Then bolt 15 is rotated to tighten toggle 17 as described above.

Referring now to FIGS. 5 and 6, an alternate embodiment of spool 25 is shown. In this embodiment, spool discs 41 and 43 are provided for attachment to the outer end of spool 25. This effectively lengthens spool 25 to allow a single spool piece 23 to accomodate a plurality of wall thicknesses.

If desired, spool discs 41 and 43 can be provided with nodes 45. These nodes 45 can mate with recessed areas 47 to secure spool elements 41 and 43 with respect to spool 25.

Referring now to FIGS. 7 and 8, another embodiment of the present invention is shown. In this embodiment leg 27 is separable from spool 25. As shown in FIG. 8, leg 27 slidably engages spool 25.

The separable leg 27 allows a single leg to be used on various diameter spools 25. It also allows legs of varying lengths to be attached to a single spool. The length of leg 27 should be such that the leg is approximately even with the end of bolt 15 when bolt 15 is fully inserted through wall board 13. This prevents toggle 17 from being positioned beyond leg 27 and freely rotating on bolt 15.

Referring now to FIG. 9, still another embodiment of the spool piece 23 is shown. In this embodiment a bushing 49 is provided about spool 25. Bushing 49 mates with spool 25 to form a spool having a greater diameter. This increases the diameter of spool 25 such that a variety of hole diameters can be accomodated. As mentioned before, it is important that leg 27 not rotate with respect to wall board 13. Therefore, the fit between spool 25 and bushing 49 must be secure.

As mentioned above, the leg 27 in each of the above embodiments allows the position of the toggle to be determined when the bolt is inserted through the wall board. This is especially important when it is anticipated that stress on the toggle bolt will be applied in a particular orientation. For example, when a toggle bolt secures a handrail, it is relatively certain that the greatest stress will be applied vertically downwardly on the handrail and on the toggle bolt securing the handrail. Accordingly, in this circumstance, it is preferable to orient the toggle bolt so that the wings of the toggle extend vertically. This orientation helps to prevent mechanical working which would occur if the toggle were oriented horizontally. It also provides a greater lever arm resistance to vertical movement of the outer end of the bolt.

Spool 25 operates to hold bolt 15 in a fixed position relative to wall board 13. This prevents undesirable shifting of the bolt in the hole. Spool 25 also centers bolt 15 in hole 31 such that the toggle wings are evenly positioned on either side of the hole 31. This fixing and centering of bolt 15 in hole 31 acts to strengthen the anchor provided by the toggle bolt.

Preferably, the spool piece 23 will be made of plastic. This material is easily molded, inexpensive and provides sufficient strength. Other materials, however, could be utilized for part or all of spool piece 23.

If desired, more than one leg such as leg 27 could be provided on spool 25. For example, an additional leg could be provided extending from spool 25 opposite leg 27. Also, the shape and position of the leg could be altered without changing its function.

Thus, the device for use with a toggle bolt of the present invention is well adapted to attain the objects and advantages mentioned as well as those inherent therein. While presently preferred embodiments of the invention have been described for the purpose of this disclosure, numerous changes in the construction and arrangement of parts can be made by those skilled in the art which changes are encompassed within the spirit of this invention as defined by the appended claims.

The foregoing disclosure and the showings made in the drawings are merely illustrative of the principles of this invention and are not to be interpreted in a limiting sense.

What is claimed is:

1. A securing device for fastening to a securing member of predetermined thickness through a hole of predetermined size in said securing member, comprising:

a threaded bolt of predetermined diameter;

a toggle threadable to said bolt having a pair of spring opened wings for expanding and bridging said hole and thereby anchoring said bolt to said securing member as said toggle is threadably tightened by said bolt against said securing member;

a spool for extending about said bolt in said hole in said securing member having a supportive axial length approximately equal to said predetermined thickness of said securing member for supporting said toggle as it is threadably tightened against said securing member to prevent said toggle from crushing said securing member, said spool having an axial opening through which said bolt can closely extend and a radial periphery for closely fitting within said hole in said securing member such that said bolt is radially fixed in said hole when said spool extends about said bolt in said hole;

a cantilever guide leg for orienting and guiding said toggle with respect to said securing member as said toggle is threadably tightened against said securing member, said guide leg freely extending axially from the radial periphery of said spool such that said bolt extends parallel to said guide leg and such that said toggle is fixedly oriented between said guide leg and said bolt when said spool is positioned in said hole in said securing member and said bolt extends through said opening in said spool and said toggle is threadedly tightened against said securing member by said bolt;

means for fixedly orienting said spool in said hole of said securing member such that said toggle is oriented with respect to said securing member as said toggle is threadedly tightened against said securing member when said spool is fixedly oriented in said hole; and means for changing the radial size of said spool such that said spool can be adjusted to fit securing members having holes of differing sizes, including a bushing which can be connected about the periphery of said spool.

2. A support and orientation device for use with a conventional toggle bolt for fastening to a securing member such as a wall through a hole of predetermined size in said securing member, said toggle bolt being of the type having:

a threaded bolt of predetermined diameter;

a toggle threadable to said bolt having a pair of spring opened wings for expanding and bridging said hole and thereby anchoring said bolt to said securing member as said toggle is threadably tightened by said bolt against said securing member;

said support and orientation device comprising:

a spool assembly means for radially supporting said bolt within said hole, axially supporting said toggle to prevent crushing of said support member as said toggle is tightened against said support member, and guiding said toggle to a predetermined orientation with respect to said support member as said toggle is tightened by said bolt, said spool assembly means being removable from and attachable to said toggle bolt so that said toggle bolt can be used conventionally without said spool assembly means, said spool assembly including:

a molded plastic spool for extending about said bolt in said hole in said securing member having a supportive axial length approximately equal to said predetermined thickness of said securing member for supporting said toggle as it is threadably tightened against said securing member to prevent said toggle from crushing said securing member, said spool having a cylindrical axial opening through which said bolt can closely extend and a radial periphery for closely fitting within said hole in said securing member such that said bolt is radially fixed in said hole when said spool extends about said bolt in said hole;

a single cantilever guide leg for orienting and guiding said toggle with respect to said securing member as said toggle is threadably tightened against said securing member, said guide leg freely extending axially from the radial periphery of said spool such that said bolt extends parallel to said guide leg and such that said toggle is fixedly oriented between said guide leg and said bolt when said spool is positioned in said hole in said securing member and said bolt extends through said opening in said spool and said toggle is threadedly tightened against said securing member by said bolt;

means for fixedly orienting said spool in said hole of said securing member such that said toggle is oriented with respect to said securing member as said toggle is threadedly tightened against said securing member when said spool is fixedly oriented in said hole; and means for changing the supportive axial length of said spool such that the length of said spool can be adjusted to fit securing members of differing thicknesses, comprising at least one disc which connected to an axial end of said spool.

3. A support and orientation device for use with a conventional toggle bolt for fastening to a securing member such as a wall through a hole of predetermined size in said securing member, said toggle bolt being of the type having:

a threaded bolt of predetermined diameter;

a toggle threadable to said bolt having a pair of spring opened wings for expanding and bridging said hole and thereby anchoring said bolt to said securing member as said toggle is threadably tightened by said bolt against said securing member;

said support and orientation device comprising:

a spool assembly means for radially supporting said bolt within said hole, axially supporting said toggle to prevent crushing of said support member as said toggle is tightened against said support member, and guiding said toggle to a predetermined orientation with respect to said support member as said toggle is tightened by said bolt, said spool assembly means being removable from and attachable to said toggle bolt so that said toggle bolt can be used conventionally without said spool assembly means, said spool assembly including:

a molded plastic spool for extending about said bolt in said hole in said securing member having a supportive axial length approximately equal to said predetermined thickness of said securing member for supporting said toggle as it is threadably tightened against said securing member to prevent said toggle from crushing said securing member, said spool having a cylindrical axial opening through which said bolt can closely extend and a radial periphery for closely fitting within said hole in said securing member such that said bolt is radially fixed in said hole when said spool extends about said bolt in said hole;

a single cantilever guide leg for orienting and guiding said toggle with respect to said securing member as said toggle is threadably tightened against said securing member, said guide leg freely extending axially from the radial periphery of said spool such that said bolt extends parallel to said guide leg and such that said toggle is fixedly oriented between said guide leg and said bolt when said spool is positioned in said hole in said securing member and said bolt extends through said opening in said spool and said toggle is threadedly tightened against said securing member by said bolt; and means for fixedly orienting said spool in said hole of said securing member such that said toggle is oriented with respect to said securing member as said toggle is threadably tightened against said securing member when said spool is fixedly oriented in said hole; and means for changing the radial size of said spool such that said spool can be adjusted to fit securing members having holes of differeing sizes; including a bushing which can be connected about the periphery of said spool.

4. A securing device for fastening to a securing member of predetermined thickness through a hole of predetermined size in said securing member, comprising:

a threaded bolt of predetermined diameter;

a toggle threadable to said bolt having a pair of spring opened wings for expanding and bridging said hole and thereby anchoring said bolt to said securing member as said toggle is threadably tightened by said bolt against said securing member;

a spool for extending about said bolt in said hole in said securing member having a supportive axial length approximately equal to said predetermined thickness of said securing member for supporting said toggle as it is threadably tightened against said securing member to prevent said toggle from crushing said securing member, said spool having an axial opening through which said bolt can closely extend and a radial periphery for closely fitting within said hole in said securing member such that said bolt is radially fixed in said hole when said spool extends about said bolt in said hole;

a cantilever guide leg for orienting and guiding said toggle with respect to said securing member as said toggle is threadably tightened against said securing member, said guide leg freely extending axially from the radial periphery of said spool such that said bolt extends parallel to said guide leg and such that said toggle is fixedly oriented between said guide leg and said bolt when said spool is positioned in said hole in said securing member and said bolt extends through said opening in said spool and said toggle is threadedly tightened against said securing member by said bolt;

means for fixedly orienting said spool in said hole of said securing member such that said toggle is oriented with respect to said securing member as said toggle is threadedly tightened against said securing member when said spool is fixedly oriented in said hole; and means for changing the supportive axial length of said spool such that the length of said spool can be adjusted to fit securing members of differing thicknesses including at least one disc which is connected to an axial end of said spool.

* * * * *